US006954285B2

(12) United States Patent
Ogata et al.

(10) Patent No.: US 6,954,285 B2
(45) Date of Patent: Oct. 11, 2005

(54) DEVELOPING METHOD AND DEVELOPING APPARATUS FEATURING TWO LATENT IMAGE DEVELOPING OPERATIONS USING TWO ELECTRICAL FIELDS

(75) Inventors: Takao Ogata, Shizuoka (JP); Kazuo Suzuki, Kanagawa (JP); Nobuhiko Zaima, Shizuoka (JP)

(73) Assignee: Canon Kabushiki Kaisha, Tokyo (JP)

( * ) Notice: Subject to any disclaimer, the term of this patent is extended or adjusted under 35 U.S.C. 154(b) by 872 days.

(21) Appl. No.: 09/842,671

(22) Filed: Apr. 27, 2001

(65) Prior Publication Data

US 2002/0051142 A1 May 2, 2002

(30) Foreign Application Priority Data

May 2, 2000 (JP) .................................... 2000-133699

(51) Int. Cl.[7] ............................ G06F 3/12; G06F 15/02

(52) U.S. Cl. ......................... 358/1.8; 358/1.9; 358/3.32

(58) Field of Search ................................. 358/1.1–1.18, 358/3.32; 355/89, 106, 107, 115, 126; 399/6, 7, 26–28, 31, 61–63, 49–55; 270/60, 19; 271/288, 298

(56) References Cited

U.S. PATENT DOCUMENTS

| | | | | |
|---|---|---|---|---|
| 5,253,018 | A | 10/1993 | Takeuchi et al. | 355/246 |
| 5,351,107 | A * | 9/1994 | Nakane et al. | 399/49 |
| 5,376,998 | A | 12/1994 | Suzuki | 355/326 |
| 5,469,244 | A | 11/1995 | Ogata et al. | 355/246 |
| 6,075,954 | A | 6/2000 | Ogata et al. | 399/60 |
| 6,449,442 | B1 * | 9/2002 | Shida et al. | 399/63 |

FOREIGN PATENT DOCUMENTS

| | | |
|---|---|---|
| JP | 6-274034 | 9/1994 |

* cited by examiner

*Primary Examiner*—Douglas Tran
(74) *Attorney, Agent, or Firm*—Fitzpatrick, Cella, Harper & Scinto

(57) ABSTRACT

The present invention provides a developing method for developing a latent image formed on an image bearing member with developer including toner and carrier contained in a developer containing portion, comprising the steps of developing a first latent image for controlling a replenishing amount of the developer to the developer containing portion by a first developing electrical field, and developing a second latent image for controlling gradation of an image by a second developing electrical field, and wherein the first developing electrical field is different from the second developing electrical field.

24 Claims, 11 Drawing Sheets

DEVELOPING METHOD AND DEVELOPING APPARATUS FEATURING TWO LATENT IMAGE DEVELOPING OPERATIONS USING TWO ELECTRICAL FIELDS

BACKGROUND OF THE INVENTION

1. Field of the Invention

The present invention relates to a developing apparatus for developing an electrostatic latent image formed on an image bearing member, for example, and more particularly, it relates to a developing apparatus used with an image forming apparatus such as a copying machine, a printer, a facsimile and the like.

2. Related Background Art

FIG. 11 is a schematic sectional view of a conventional color image forming apparatus.

Such a conventional image forming apparatus includes a digital color image reader portion at its upper part, and a digital color image printer portion at its lower part.

In the reader portion, an original 30 is rested on an original platen glass 31, and a reflected light image from the original 30 obtained by exposure-scanning the original by means of an exposing lamp 32 is focused on a full-color sensor 34 through a lens 33, thereby obtaining a color decomposition image signal. The color decomposition image signal is sent, through an amplifying circuit (not shown), to a video processing unit (not shown), where the signal is processed, and then, the processed signal is sent to the printer portion.

In the printer portion, a photosensitive drum 1 as an image bearing member is supported for rotation in a direction shown by the arrow R1, and, around the photosensitive drum 1, there are disposed a pre-exposure lamp 11, a corona electrifier 2, an exposing optical system 3, a potential sensor 12, four developing devices 4 (4*y*, 4*c*, 4*m*, 4*k*), toner (on drum) detecting means 13, a transferring device 5 and a cleaning device 6.

The image signal from the reader portion is inputted to the laser beam exposing optical system 3, where the signal is converted into a light signal by means of a laser output portion (not shown), and the light signal or laser beam is reflected by a polygon mirror 3*a* and then is passed through a lens 3*b* and a mirror 3*c* to scan (raster scanning) a latent image on the photosensitive drum 1, thereby obtaining a light image E.

In the printer portion, during image formation, first of all, the photosensitive drum 1 is rotated in the direction shown by the arrow R1, and electricity is removed from the drum by the pre-exposure lamp 11, and then, the photosensitive drum is uniformly electrified by the electrifier 2. Then, for each decomposed color, the light image E is lighted to form an electrostatic latent image corresponding to the decomposed color on the surface of the photosensitive drum 1.

Then, for each decomposed color, the corresponding developing device 4 is operated to develop the latent image on the photosensitive drum 1, thereby forming a toner image (mainly including resin). The developing devices 4*y*, 4*m*, 4*c*, 4*k* are selectively approached to the photosensitive drum 1 by means of eccentric cams 24*y*, 24*m*, 24*c*, 24*k* to develop the respective latent images.

A recording material is conveyed from a recording material cassette 7 to the transferring device 5 by means of a conveying system, and then, the recording material is supplied, by the transferring device 5, to a transferring station opposed to the photosensitive drum 1. The toner image formed on the photosensitive drum 1 is transferred onto the recording material supplied to the transferring station. In this example, the transferring device 5 includes a transfer drum 5*a*, a transferring electrifier 5*b*, an absorbing electrifier 5*c* and an opposed absorbing roller 5*g*, an inner electrifier 5*d* and an outer electrifier 5*e*, and a recording material bearing sheet 5*f* is provided around a circumferential opening of the transfer drum 5*a* in a cylindrical form. The recording material bearing sheet 5*f* is formed from a dielectric sheet made of polycarbonate film.

The recording material conveyed to the transferring device 5 is absorbed on the recording material bearing sheet 5*f* by means of the absorbing electrifier 5*c* and the absorbing roller 5*g* so that the recording material is passed through the transferring station as the transfer drum 5*a* is rotated, and, in the transferring station, the toner image on the photosensitive drum 1 is transferred onto the recording material by the transferring electrifier 5*b*.

During predetermined revolutions of the transfer drum, on the recording material absorbed on the recording material bearing sheet 5*f* and conveyed in this way, predetermined different color toner images are transferred from the photosensitive drum 1 in a superimposed fashion, thereby forming a full-color toner image.

In case of a four-color mode, when the transferring of four color toner images is completed, the recording material is separated from the transfer drum 5*a* by a separation pawl 8*a*, a separation push-up roller 8*b* and a separation electrifier 5*h*, and the separated recording material is discharged onto a tray 1 through a thermal fixing device 9.

On the other hand, after the transferring, residual toner remaining on the photosensitive drum 1 is removed by the cleaning device 6 for preparation for next image formation.

When images are formed on both surfaces of the recording material, after the recording material leaves the fixing device 9, a convey path switching guide 19 is driven, so that the recording material is temporarily introduced into a turn-over path 21*a* through a sheet discharge vertical path 20 and then is temporarily stopped there. Then, by rotating a reverse rotation roller 21*b* reversely, the recording material is advanced in a direction opposite to the introduced direction with a trailing end thereof directing forwardly, with the result that a front surface and a rear surface of the recording material is reversed and the recording material is stored on an intermediate tray 22. Thereafter, the recording material is conveyed to the transfer drum 5*a* again, where an image is formed on the other surface of the recording material in the same image forming process as mentioned above. Then, the recording material is discharged onto the discharge tray 10 through the fixing device 9.

The recording material bearing sheet 5*f* of the transfer drum 5*a* from which the recording material was separated can be contaminated by adhesion of paper powder scattered from the photosensitive drum 4, developing devices 4 and cleaning device 6 and adhesion of toner upon occurrence of sheet jam and adhesion of oil during the image formation. In such a case, the contamination is cleaned by a fur brush and a back-up brush, and an oil removing roller 16 and a back-up brush, which are opposed to each other with the interposition of the recording material bearing sheet 5*f*, for preparing for next image forming process. Such cleaning is effected in pre-rotation and post-rotation and is always effected after occurrence of the sheet jam.

Further, in this example, a transfer drum eccentric cam 25 is operated to drive a cam follower 5*i* formed integrally with the transfer drum 5*a*, with the result that a gap between the recording material bearing sheet 5*f* and the photosensitive drum 1 can be set to a predetermined gap at a predetermined timing. For example, during a stand-by condition or when a power supply is turned ON, the distance between the transfer drum and the photosensitive drum is increased, so that the rotation of the transfer drum can be effected independently from the rotation of the photosensitive drum.

Further, the developing device 4 (4*y*, 4*c*, 4*m* or 4*k*) performs the following developing operation in the image forming operation. When the electrostatic latent image reaches a developing station opposed to a developing sleeve 41 of the developing device 4 by the rotation of the photosensitive drum 1, developing bias obtained by overlapping AC and DC is applied to the developing sleeve 41 from a developing bias power supply (not shown), and the developing sleeve 41 is rotated in a direction shown by the arrow B by a developing sleeve driving device (not shown) and, pressurization is effected by a developing pressurizing cam 24 (24*y*, 24*c*, 24*m*, 24*k*). In this condition, the latent image is developed.

Further, when the gradation of the toner image formed on the photosensitive drum (toner image eventually formed on the recording material) is controlled (i.e., a half-tone image is formed), a density detecting patch latent image is formed on the photosensitive drum 1, and the patch latent image is developed with toner by applying the developing bias to the developing sleeve 41 to obtain a patch image density of which is in turn read by a patch sensor 13. If the read image density does not reach a reference value, an image signal level is adjusted. By such adjustment, an exposed portion potential on the photosensitive drum exposed by the exposing optical system for the image signal is adjusted, and, the density value of the developed patch image at this point is fed-back again to a CPU 300 as an initial reference value. By effecting such operation for each color, the gradation of each color toner image formed on the photosensitive drum can be optimized, thereby obtaining a good half-tone image.

Further, when an amount of toner replenished into each developing device 4 in order to keep the density of the toner contained in each developing device 4 substantially constant, a patch image having predetermined density is formed on the photosensitive drum 1 (for example, between areas where normal images were formed during the image formation), and, by controlling the amount of the toner replenished into the developing device 4 in order to always keep an output value of the sensor 13 constant, i.e., in order to keep the density of the toner contained in the developing device 4 substantially constant, a weight ratio (T/C ratio) between the toner and carrier is optimized to obtain the image having the optimum density.

However, in the case where the gradation of the toner image formed on the photosensitive drum is controlled and in the case where the amount of the toner replenished into the developing device 4 in order to keep the density of the toner contained in the developing device 4 substantially constant, if developing electrical fields (biases to be applied to the developing sleeve) for developing both patch latent images are selected to be the same, the load due to the developing electrical field acts on developer (toner), thereby shortening the service life of the developer.

SUMMARY OF THE INVENTION

An object of the present invention is to provide a developing method in which load acting on developer is reduced to enhance the service life of the developer while improving image gradation control and/or developer replenishing control.

Another object of the present invention is to provide a developing method in which both image gradation control and developer replenishing control can be effected effectively.

A further of the present invention is to provide a developing apparatus in which load acting on developer is reduced to enhance the service life of the developer while improving image gradation control and/or developer replenishing control.

A still further object of the present invention is to provide a developing apparatus in which both image gradation control and developer replenishing control can be effected effectively.

The other objects and features of the present invention will be more apparent from the following detailed explanation of the invention referring to the accompanying drawings.

DESCRIPTION OF THE PREFERRED EMBODIMENTS

The present invention will now be fully explained in connection with embodiments thereof with reference to the accompanying drawings.

First Embodiment

Figure 1:
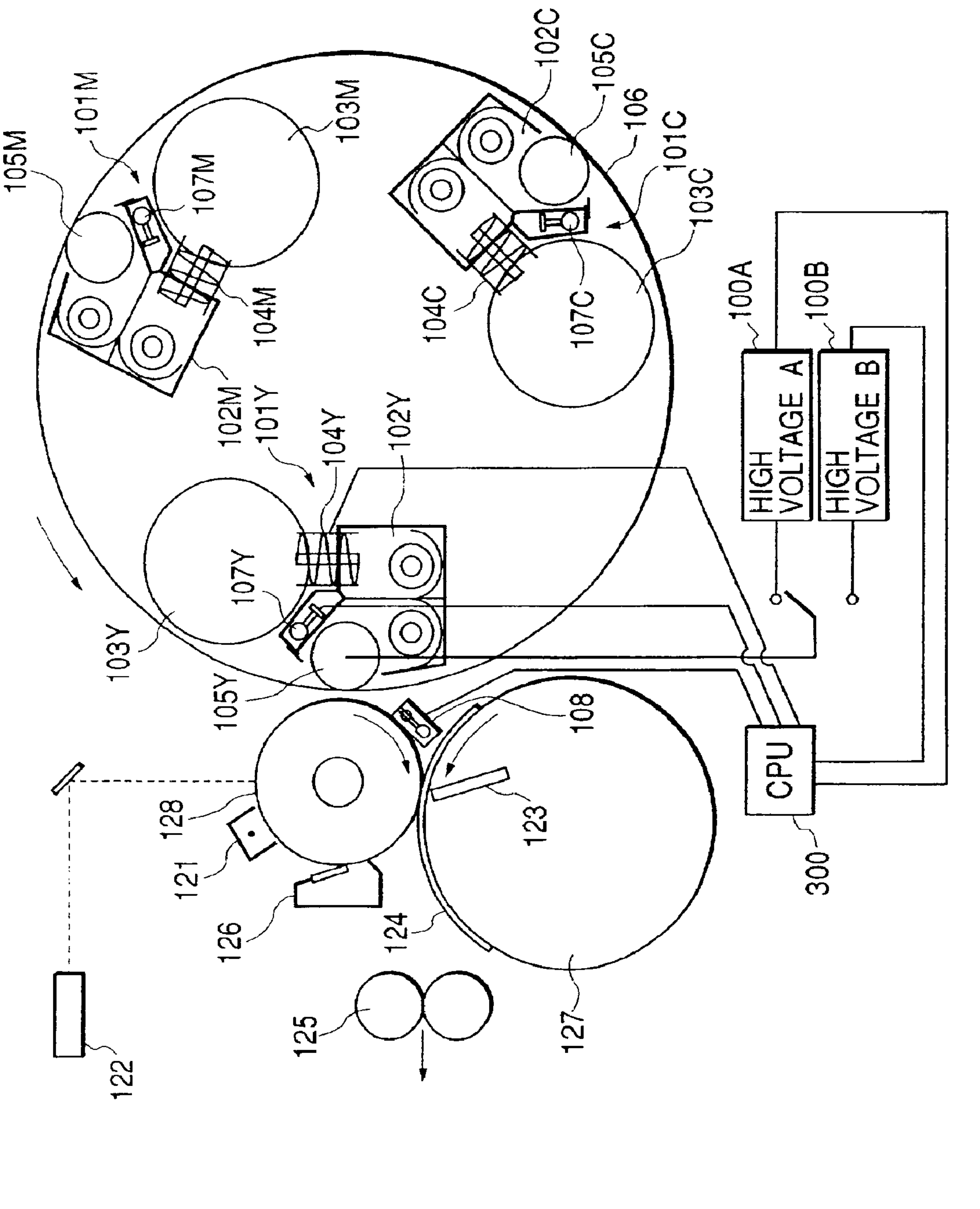
FIG. 1 is a schematic view showing an embodiment of an image forming apparatus according to the present invention.

FIG. 1 is a schematic view showing an embodiment of an image forming apparatus according to the present invention. In this embodiment, developing biases to be applied to developing devices 101Y to 101C (developing sleeves) for developing an electrostatic latent image formed on a photosensitive drum 128 as an image bearing member can be switched.

As shown in FIG. 1, in the image forming apparatus, around the photosensitive drum 128 as an electrophotographic photosensitive member, there are disposed a primary electrifier 121 as electrifying means, a laser 122 as exposing means, three developing devices 101Y, 101M, 101C as developing means, a transfer drum 127 as recording material bearing means, and a cleaner 126 as cleaning means. Further, a fixing device 125 as fixing means is also provided. An image density sensor 108 as image density detecting means for detecting density of an image density controlling patch image, i.e., detecting a toner image formed on the photosensitive drum 128 is provided in a confronting relationship to the photosensitive drum 128 between the transfer drum 127 and the developing apparatus 104 (i.e., at a downstream side of a developing station and at an upstream side of a transferring station in a rotational direction of the photosensitive drum).

The three developing devices 101Y to 101C (developing apparatus 101) are mounted on a developing rotary member 106 equidistantly in a circumferential direction and can be selectively shifted to the developing station. The developing devices 101Y, 101M, 101C have developing containers 102 (102Y, 102M, 102C) as developer containing portions each containing two-component developer comprised of non-magnetic toner and magnetic carrier. The developing devices have opening portions opposed to the photosensitive drum 128 and developing sleeves 105 (105Y, 105M, 105C) as developer carrying members are disposed in the opening portions in a partially exposed fashion. Each developing sleeve includes therein a fixed (non-rotating) magnet (magnetic poles) as magnetic field generating means. Further, during the developing operation, although each developing sleeve is spaced apart from the surface of the photosensitive drum by a predetermined distance, a magnet brush formed on the developing sleeve is contacted with the surface of the photosensitive drum.

In the developing operation, the developing sleeve 105 carries thereon the two-component developer in the developing device 101 (during the development, the magnet brush is formed and carried on the surface of the developing sleeve) and sends the developer to the developing station opposed to the photosensitive drum 128. In this case, developing bias which will be fully described later is applied to the developing sleeve, with the result that the developer is electrostatically adhered to the electrostatic latent image formed on the photosensitive drum 128, thereby forming a visualized image (toner image) on the photosensitive drum. After the latent image is developer, the developer is returned to the developing device 101 as the developing sleeve 105 is rotated.

Density sensors 107 (107Y, 107M, 107C) as developer density detecting means for detecting toner density of the contained developer are provided in the developing devices 101, and, in the vicinity of the developing devices 101, there are provided toner replenishing containers 103 (103Y, 103M, 103C) for replenishing the tone (in this embodiment, a cartridge system which can detachably attachable to a main body of the image forming apparatus is adopted), and toner carrying screws 104 (104Y, 104M, 104C). Each sensor 107 has a light emitting portion and a light receiving portion so that, when light emitted from the light emitting portion and reflected by the developer is received by the light receiving portion, information corresponding to the density of the toner contained in the developing device is detected. And, a detected result is compared with a reference value in a CPU. In the CPU, if it is judged that the toner density is small, on the basis of such data, an amount of the toner to be replenished from the toner cartridge 103 to the developing device 101 by the screw 104 is calculated and controlled. With this arrangement, new toner corresponding to the toner consumed by the image formation is replenished, thereby keeping the toner amount (a ratio between the toner and carrier) in the developing device substantially constant.

Three-color (full-color) image formation is effected as follows. After the photosensitive drum 128 is rotated and the surface of the photosensitive drum 128 is uniformly charged by the electrifier 121, by exposing the photosensitive drum by means of the laser 122 in response to image information of the original (image signal), the electrostatic latent image corresponding to a first color (for example, yellow) component is formed on the surface of the photosensitive drum 128, and the latent image is developed by the yellow developing device 101Y to form an yellow toner image on the photosensitive drum 128. Then, the yellow toner image is transferred onto a recording material 124 such as a paper or a light permeable resin sheet (OHP sheet) on the transfer drum 127 by transfer bias from a transferring electrifier 123. After the transferring, residual toner remaining on the photosensitive drum 128 is removed by the cleaner 126.

Then, the photosensitive drum 128 is electrified again and exposed by the laser 122, thereby forming an electrostatic latent image corresponding to a next color (for example, magenta) component. Meanwhile, the rotary member 106 is rotated in a direction shown by the arrow by an angle of 120° to bring the magenta developing device 101M in front of the photosensitive drum 128. Then, the formed latent image is developed by the developing device 101M to form a magenta toner image on the photosensitive drum 128. The magenta toner image is transferred onto the recording material 124 in a superimposed (on the already transferred yellow toner image) fashion. Similarly, a cyan toner image is formed and is transferred onto the recording material 124 in a superimposed fashion.

After the three color toner images are transferred to the recording material 124 in the superimposed fashion in this way, the recording material 124 is separated from the transfer drum 127 and then is sent to the fixing device 125, where the three color toner images are fixed as a permanent full-color images by heat and pressure, and the recording material is discharged out of the image forming apparatus as a print image (output image).

Figure 2:
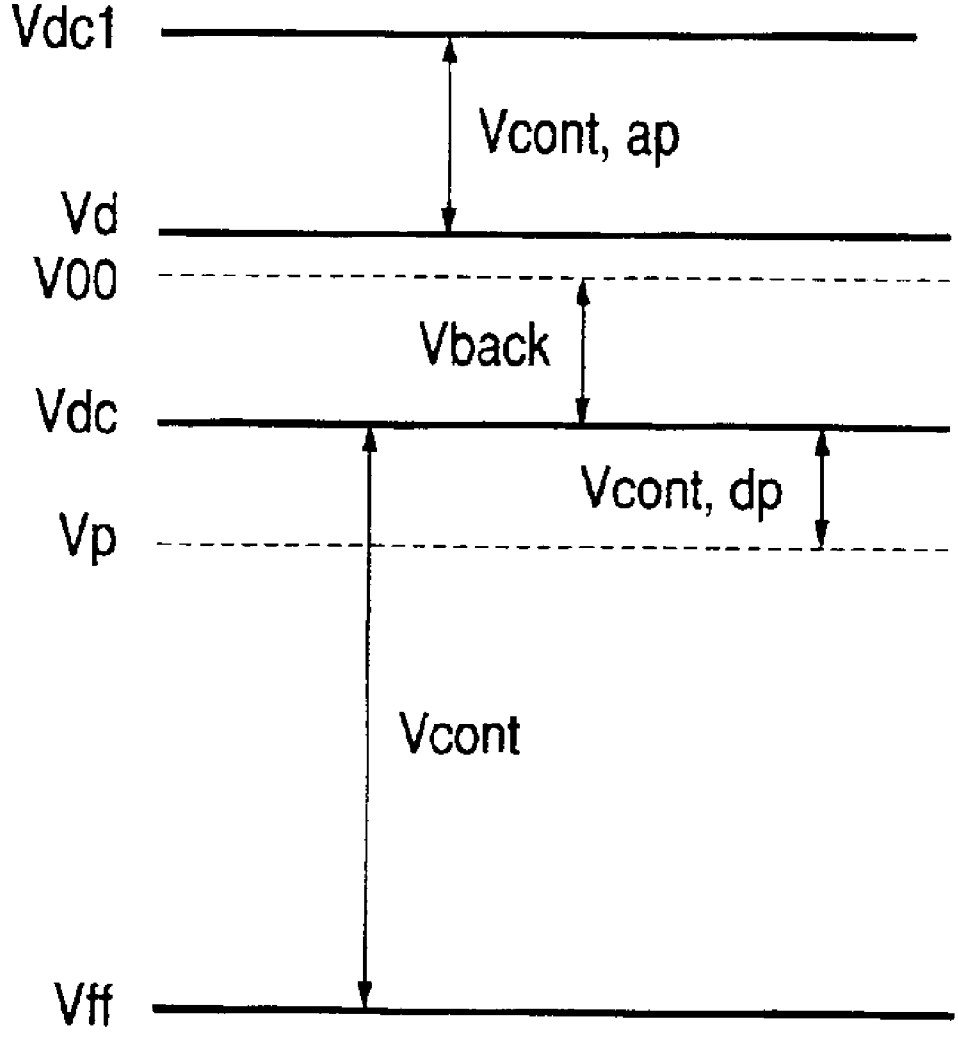
FIG. 2 is a schematic view showing potentials on a photosensitive drum of the image forming apparatus of FIG. 1.

FIG. 2 is a view showing potentials on the photosensitive drum.

When it is assumed that a value of potential obtained by electrifying the photosensitive drum 128 by means of the primary electrifier 121 is Vd, electrified potential on the photosensitive drum obtained by level light emission by means of the laser 122 is V00, potential on the photosensitive drum obtained by $ff_{hex}$ light emission is Vff and DC component of the developing bias is Vdc, fog removal potential Vback can be represented as |Vdc−V00| and developing contrast can be represented as |Vff−Vdc|. When it is assumed that laser output for forming the latent image for the patch image is $P_{hex}$, the potential of the photosensitive drum is Vp and contrast potential Vcont,dp of the patch latent image is |Vp−Vdc|.

In the initial setting of the image forming apparatus or immediately after the toner replenishing container is exchanged, the patch image having Vcont,dp is formed on the photosensitive drum 128 on the basis of a predetermined environment table (a process condition corresponding to temperature/humidity information) stored in a ROM as memory means (setting values of the process condition such as exposing intensity, developing bias and transferring bias are previously stored), and a toner replenishing patch latent image or a gradation controlling patch latent image is developed to obtain a patch image (referred to as "digital image").

When the replenishing amount of toner is controlled, as mentioned above, density of the patch image is detected by the image density detecting sensor 108, and a detected output value is sent to the CPU as an initial value. And, the amount of toner replenished from the toner cartridge 103 to the developing device 101 is controlled so that the initial value becomes the same as the density of the toner replenishing patch image detected in the later density control, i.e., sensor output value.

Further, the contrast potential Vcont,ap of the patch latent image may be obtained by difference in potential between the developing bias Vdc1 and the photosensitive drum potential Vd (potential on an area which is electrified by the electrifier 121 but is not exposed) and such latent image may be developed to form the toner replenishing patch image (referred to as "analogue patch image"). Also in this case, similar to the above, the initial value setting can be effected, and the analogue patch image can be formed and the toner replenishing amount control can be made during the copy sequence (during which the plural images are continuously formed on the photosensitive drum (i.e., on the recording material)).

Incidentally, in the present invention, the image obtained by developing the latent image formed by digital exposure is called as "digital image" and its latent image is called as "digital latent image", and, to distinguish from them, when the patch image is formed without the above-mentioned exposure, such latent image is called as "analogue latent image", and the image obtained by developing such latent image is called as "analogue image". Hereinbelow, these terms are used, if necessary.

However, the property (particularly, photosensitive property) of the photosensitive drum can be changed from the initial setting value due to deterioration of the photosensitive drum for long term use and/or change in the environment. In such a case, there arises a difference between potential obtained by exposing the photosensitive drum by the laser output P and potential in the initial setting to be essentially obtained, with the result that the density of the image formed on the photosensitive drum is deviated from the desired value due to such potential difference. In such a case, if the toner replenishing control is effected on the basis of the image density value including such error, the toner density in the developing device is deviated from the desired range, with the result that the density of the formed image may become too great or toner fog may be generated, thereby leading to a poor image.

In particular, in consideration of low cost and compactness, since the toner replenishing amount is controlled via the toner replenishing patch toner image in a condition that a photosensitive member potential measuring sensor which has high function and high cost is omitted, dispersion of density of the developer in the developing device becomes great and the load acting on the developer is increased, with the result that there is a danger of increase in abnormal image such as fog and/or reduction of service life of the developer.

Thus, in the illustrated embodiment, in order to eliminate dispersion in potential at the laser lighting area on the photosensitive drum due to change in the photosensitive property of the photosensitive drum, an analogue patch forming method in which the toner replenishing patch latent image is formed with stable potential and without laser exposure and the latent image is developed to form the patch image is adopted.

As a result, by stabilizing the density of the toner replenishing patch image and by improving the detecting accuracy of the patch image, the load acting on the developer is reduced, thereby obtaining a stable output image having no fog. The control is effected as follows.

Figure 3:
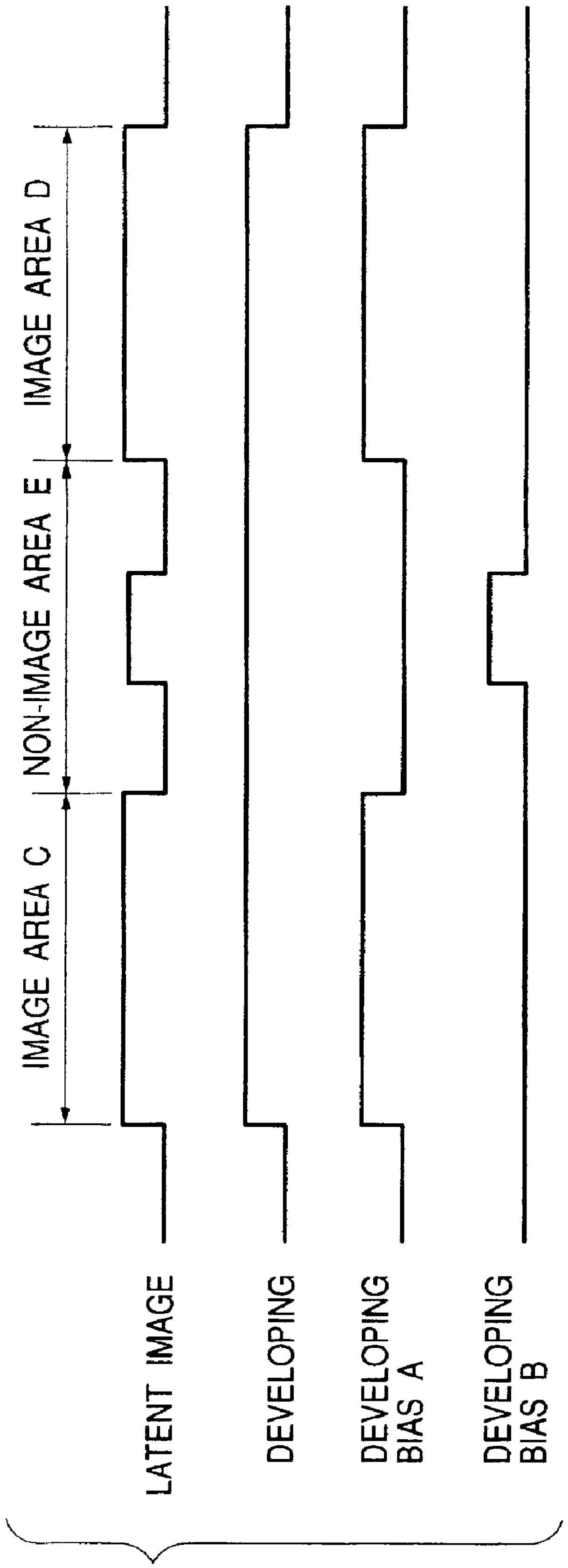
FIG. 3 is a view showing sequences in density control in the embodiment of FIG. 1.
Figure 5A:
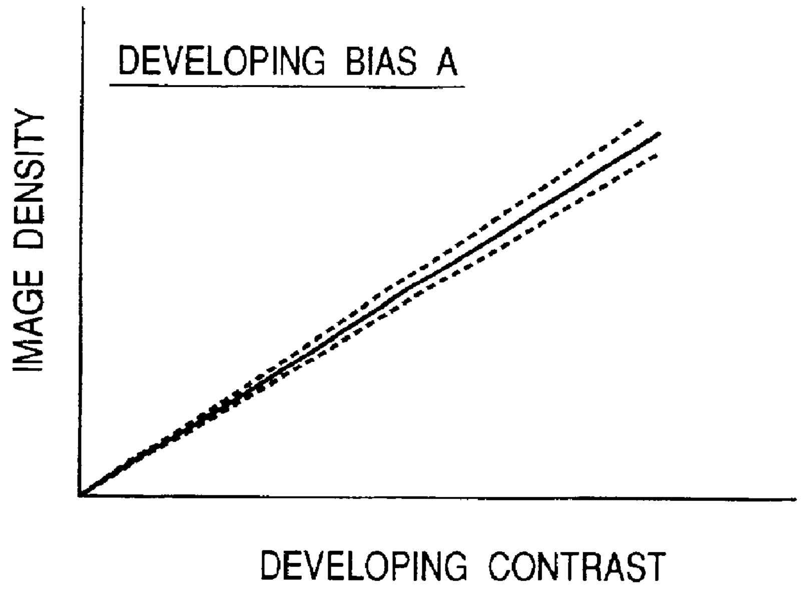
FIGS. 5A and 5B are graphs showing developing properties of the developing biases A, B of FIGS. 4A and 4B.
Figure 5B:
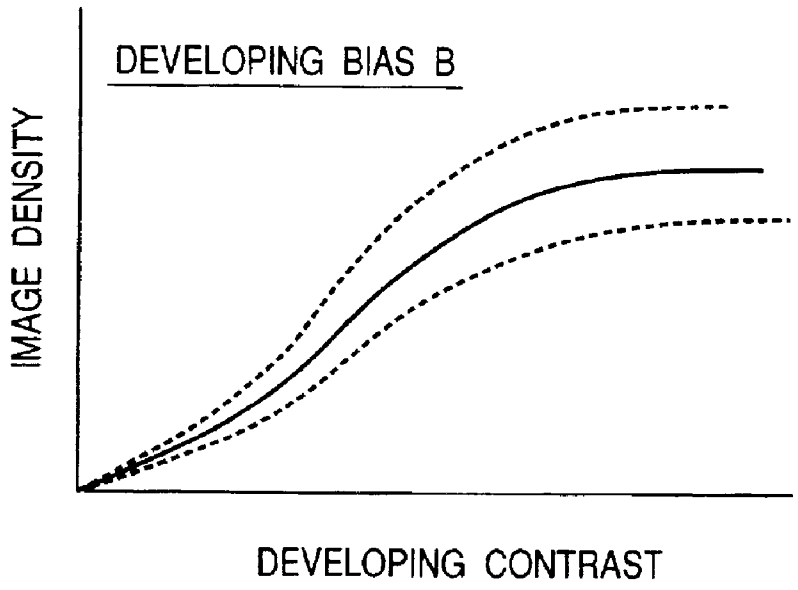
Figure 6:
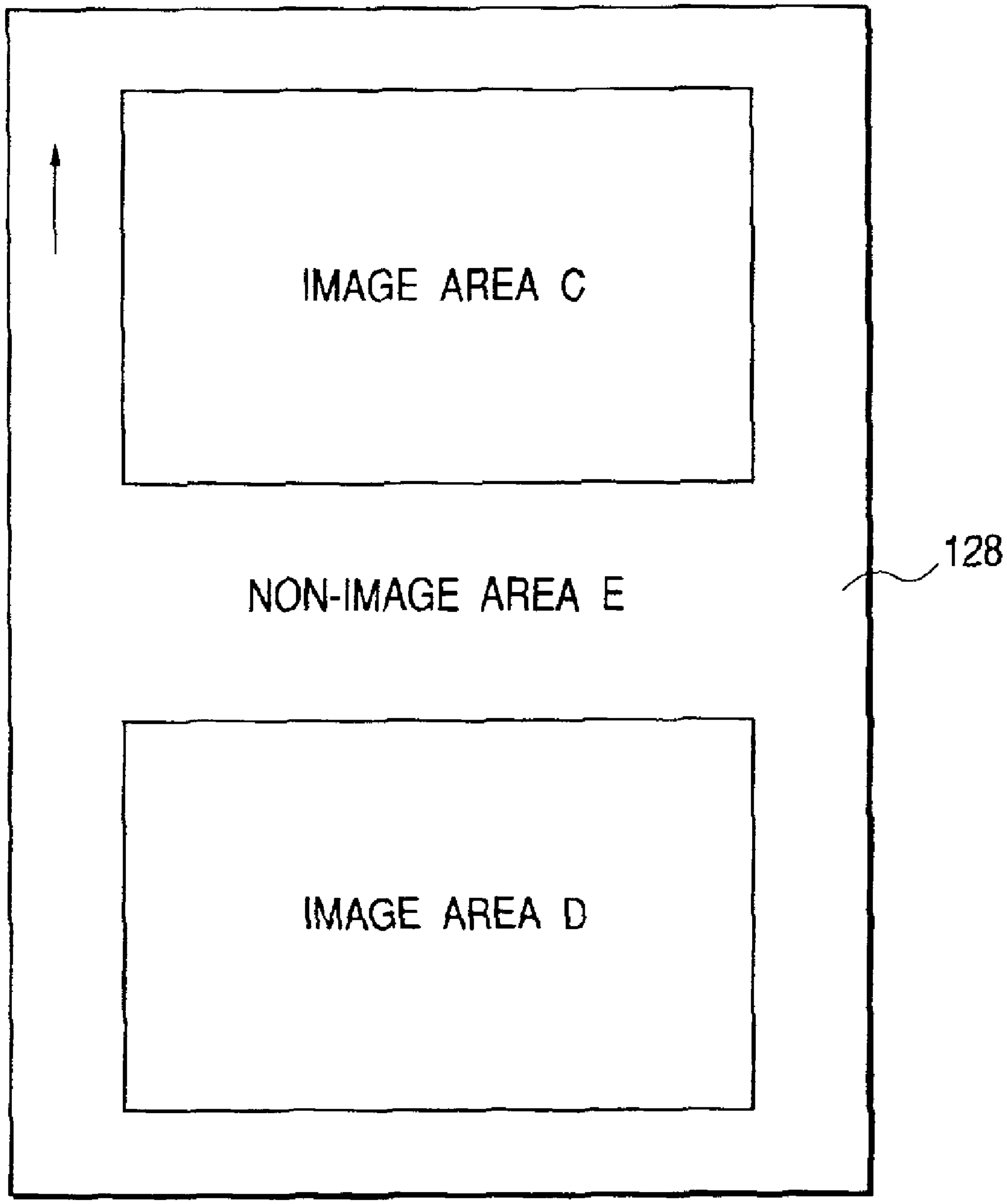
FIG. 6 is a view showing image areas where an output image and a patch images are formed and a non-image area on the photosensitive drum in the embodiment of FIG. 1.

The image forming apparatus shown in FIG. 1 has two high voltage power supplies 100A, 100B as developing bias high voltage power supplies connected to a CPU 300 as control means, and developing bias A and developing bias B can be switched and applied to the developing devices 101. FIG. 3 shows a timing chart for switching the developing bias during the image formation (in FIG. 3 "latent image" indicates a period during which the latent image is being formed "developing" indicates a period during which the developing sleeve is being rotated, and "developing bias A" and "developing bias B" indicate period during which the developing bias A and the developing bias B are being applied to the developing sleeve). FIG. 4 shows time waveforms of the developing biases A, B as alternating voltages to be applied to the developing sleeve (the abscissa indicates time and the ordinate indicates voltage applied to the developing sleeve). FIG. 5 shows developing properties of the developing biases A, B (the abscissa indicates developing contrast potential (absolute value) and the ordinate indicates density of the patch image detected by the sensor 108). FIG. 6 shows image areas and a non-image area on the photosensitive drum when the images are continuously formed on plural recording materials (the arrow indicates a shifting direction of the photosensitive drum).

Figure 4A:
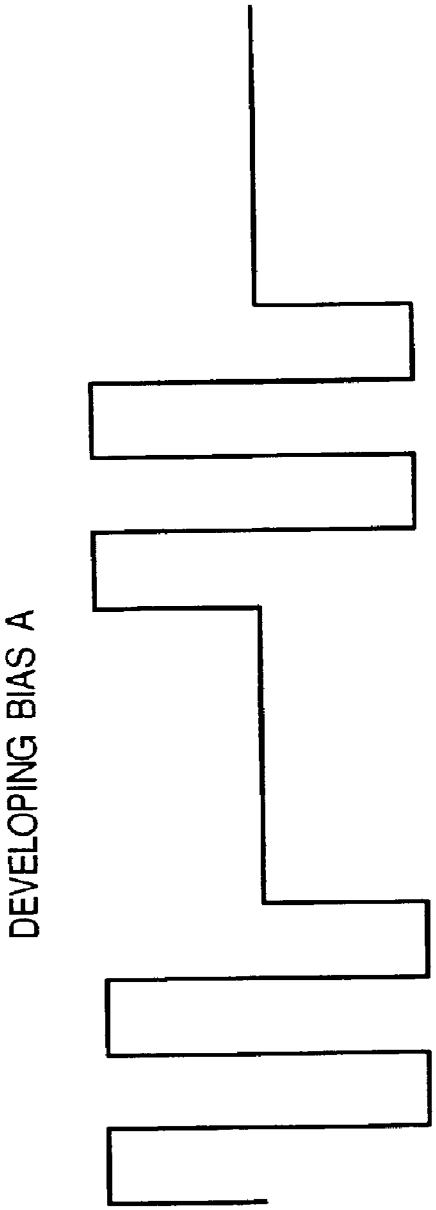
FIGS. 4A and 4B are views showing waveforms of two developing biases A, B used in the embodiment of FIG. 1.

Explaining a part of the continuous image formation with reference to FIG. 3, the electrostatic latent image corresponding to the normal image to be formed on an image area C on the photosensitive drum 128 is formed as the digital latent image, and, when the latent image reaches the developing station opposed to the developing device 101, the developing bias A shown in FIG. 4A is applied to the developing sleeve 105 of the developing device 101 from the high voltage power supply 100A, thereby developing the latent image. There is a non-image area E on the photosensitive drum 128 until an electrostatic latent image for a next normal image is formed, and the toner replenishing patch image is formed on the non-image area E and the toner replenishing control is effected.

Figure 4B:
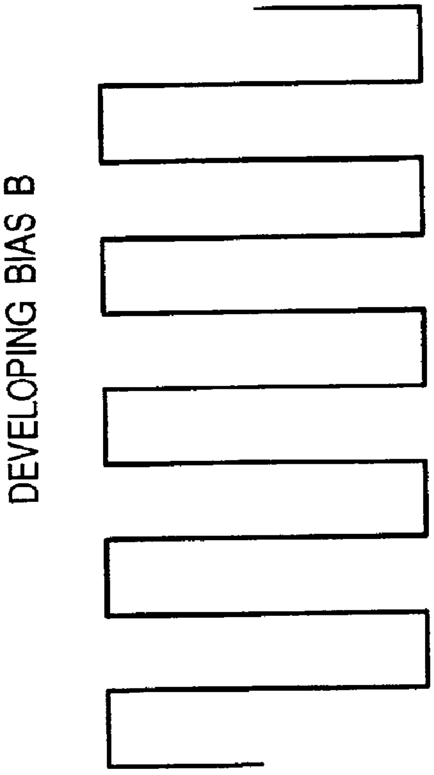

In the non-image area E, the analogue latent image having potential difference with respect to the developing bias potential Vdc1 is formed by only effecting electrification of Vd without effecting the laser exposure of the photosensitive drum, and, when the patch latent image reaches the developing station, the developing bias is switched from A in FIG. 4A to B in FIG. 4B, and, the developing is effected by using the switched developing bias B, thereby forming the analogue patch image. When a next image area D reaches the developing station, the developing bias is switched again from B to A, and the latent image for the output image on the image area D is developed.

The developing bias A shown in FIG. 4A is bias (blank pulse bias) having alternately a predetermined number of rectangular wave pulse portion (alternating portion where an alternating electrical field is formed by applying voltage obtained by overlapping AC voltage and DC voltage to the developing sleeve) and a blank portion (pause portion where a constant electrical field is formed by applying only DC voltage to the developing sleeve). When such developing bias A is used, as shown in FIG. 5A, even if the toner density in the developing device is changed, the density of the image (toner image) formed on the photosensitive drum is hard to be influenced by such change (in the Figure, an ideal curve is shown by the solid line, and image densities obtained when the toner density in the developing device is changed are shown by the dotted lines), thereby providing a developing property capable of stabilizing the image density. The developing bias A tends to give the great load to the developer in the developing operation and to fasten the deterioration of the developer.

The developing bias B shown in FIG. 4B is rectangular wave pulse bias having repeatedly alternating portions where an alternating electrical field is formed by applying voltage obtained by overlapping AC voltage and DC voltage to the developing sleeve. When such developing bias B is used, as shown in FIG. 5B, there is obtained a developing property in which the density of the image (toner image) to be formed (developed) is faithfully reflected and reproduced with respect to the toner density in the developing device (in the Figure, an ideal curve is shown by the solid line, and image densities obtained when the toner density in the developing device is changed are shown by the dotted lines), with the result that the changed amount of the developer density is sensibly reflected upon the changed amount of the image density. The developing bias B tends to give the small load to the developer in the developing operation and to suppress the deterioration of the developer.

In this way, the developing bias used in the developing of the toner replenishing control patch latent image at the non-image portion during the continuous copy sequence is switched from the developing bias A in which the changed amount of the toner image density does not follow the changed amount of the developer density and the density of the toner image is stabilized to the developing bias B in which the changed amount of the developer density is sensibly reflected upon the changed amount of the image density.

Further, since the toner replenishing patch image is formed as the analogue image by switching from the output image formed as the digital image at the image area, the patch image can be formed better in the non-image area, with the result that the reliability of the detected output value of the sensor can be enhanced and, thus, the load acting on the developer can be reduced and the density of the output image in the image area can be stabilized and the fog can be eliminated.

Further, in the illustrated embodiment, the image density is further stabilized by special control sequence (other than the sequence during the normal image formation) such as post-rotation process after the completion of the normal image formation (for cleaning the photosensitive drum and the transfer drum), pre-rotation during the rising-up of the main body of the image forming apparatus and interruption sequence operated at the special timing.

Figure 7:
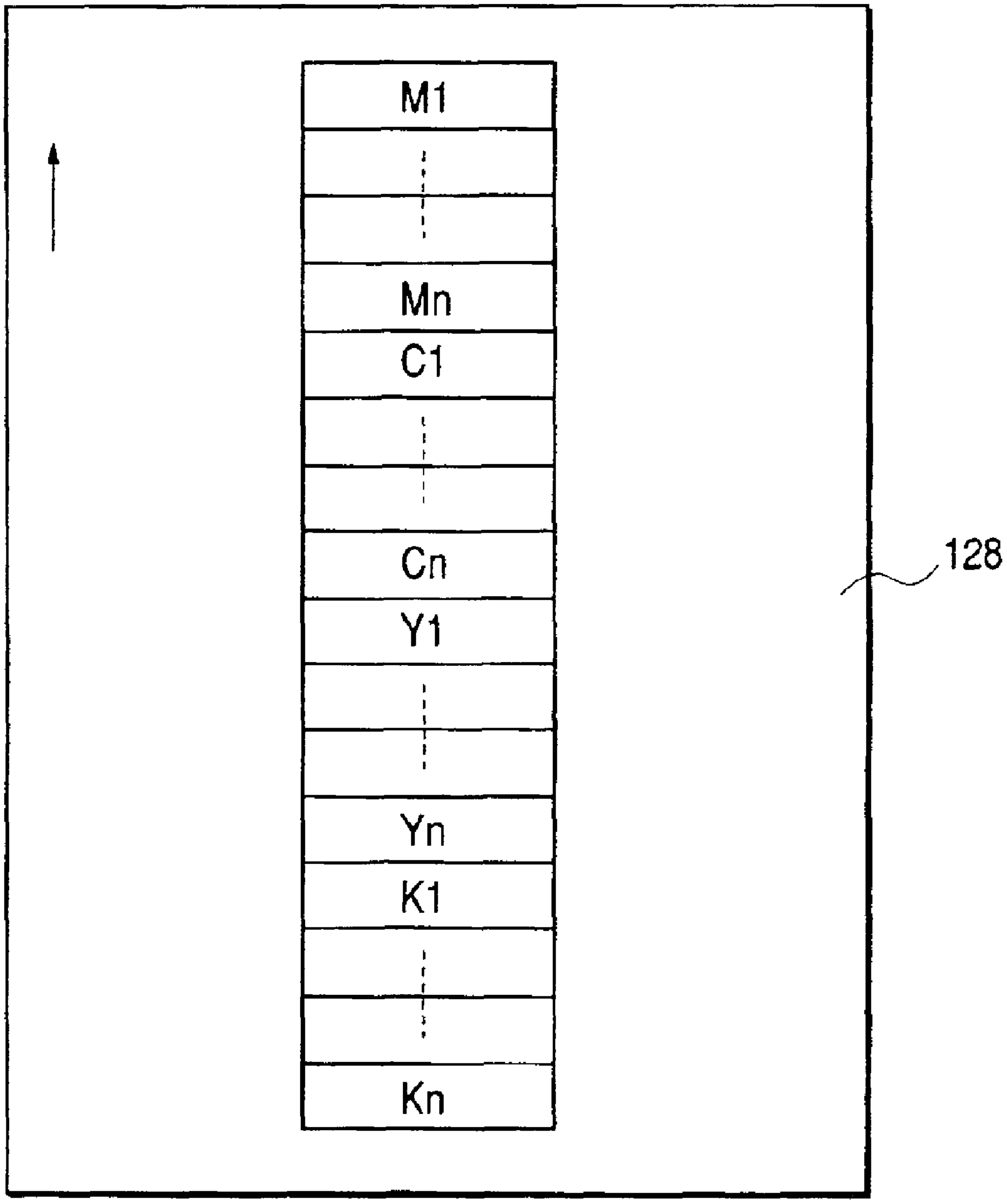
FIG. 7 is a schematic view showing a method for forming a gradation correcting patch image to be formed during image formation in the embodiment of FIG. 1.

FIG. 7 is a development view of the image area showing formation of image gradation control patch images in the special control sequence other than the sequence during the normal image formation. This is a mode for detecting whether the half-tone image formed on the photosensitive drum (eventually formed on the recording material) is properly reproduced or not, and, the exposing portion potential on the photosensitive drum exposed by the exposing optical system is corrected by correcting the image signal inputted to the exposing optical system on the basis of the detected result. However, a back developing device is mounted in the image forming apparatus of FIG. 1, as well as the yellow, magenta and cyan developing devices.

In the special control sequence, at the image area on the photosensitive drum 128, as shown in FIG. 7, for magenta (M), cyan (C), yellow (Y) and black (K) colors, a plurality of image gradation controlling patches M1 to Mn, C1 to Cn, Y1 to Yn and K1 to Kn (M1 to Mn are images obtained by developing latent images having different densities step by step (C1 to Cn, Y1 to Yn and K1 to Kn are also same)) are formed with digital images. The developing of the patch latent images is effected by using the developing bias A in which the density of the formed image does not follow the changed amount of the toner density in the developing device and the image is stabilized, unlike to the developing of the toner replenishing patch latent image formed in the non-image area between the plural images formed on the plural recording materials.

Figure 8:
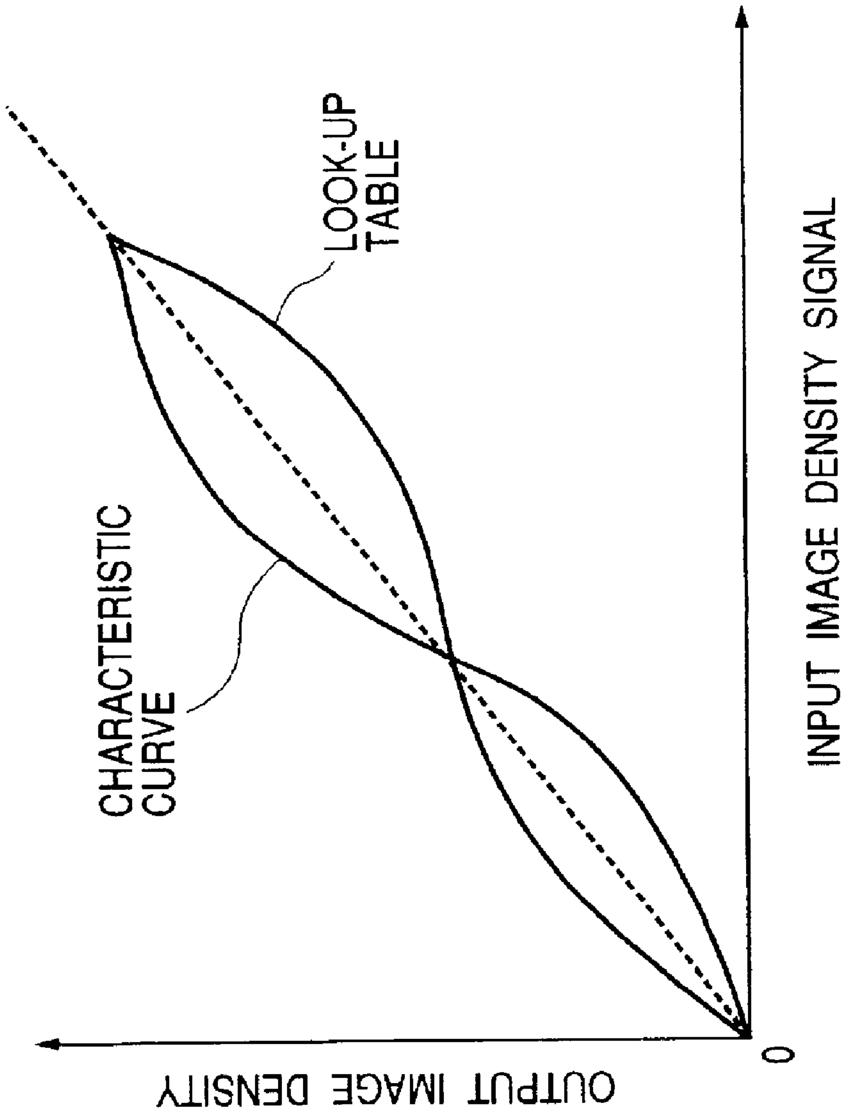
FIG. 8 is an explanatory view showing a method for correcting a gradation correcting look-up table by means of density detection of the patch image of FIG. 7.

The image gradation control patch images are read by the detecting sensor 108, and, as shown in FIG. 8, a property curve plotting output image densities with respect to the input image density signals inputted to the exposing optical system can be obtained. The CPU forms a look-up table so that the property curve becomes linear as shown by the broken line, and, by effecting gradation correction of an image formed later and correction of electrified potential of the photosensitive drum, a more stable output image can be obtained. Incidentally, in FIG. 8, the abscissa indicates the image density signal inputted to the exposing optical system (signal having density which is increased as goes to the right), and the ordinate indicates the detected density (detected by the sensor 108) of the toner image obtained by developing the latent image formed by the image signal.

As mentioned above, according to the illustrated embodiment, by switching the developing bias between the image area and the non-image area during the image formation, the normal output image in the image area can be stabilized and the reliability of the density detecting output of the developer replenishing control image in the non-image area can be enhanced, and, in the above-mentioned special control, by developing the image gradation control patch latent image by using the developing bias different from the developing bias used in the developing of the developer replenishing control latent image in the non-image area, the reliability of the detecting output of the density of the image gradation control patch image can be enhance and the load acting on the developer can be reduced and the stable output image having no fog can be obtained.

Second embodiment

In the first embodiment, while an example that the patch image formed in the non-image area of the photosensitive drum is formed as the analogue image between the images formed continuously on the plural recording materials was explained, in a second embodiment of the present invention, a patch image is formed as the digital image in which the patch latent image is formed by the laser exposure. Also in this case, the similar advantages to the first embodiment can be achieved.

Similar to the first embodiment, also in the second embodiment, although the patch images are formed on the photosensitive drum in the special control sequence other than the sequence during the normal image formation, in the second embodiment, the patch images are formed as the analogue patch images and are used for the toner replenishing amount control.

Figure 9:
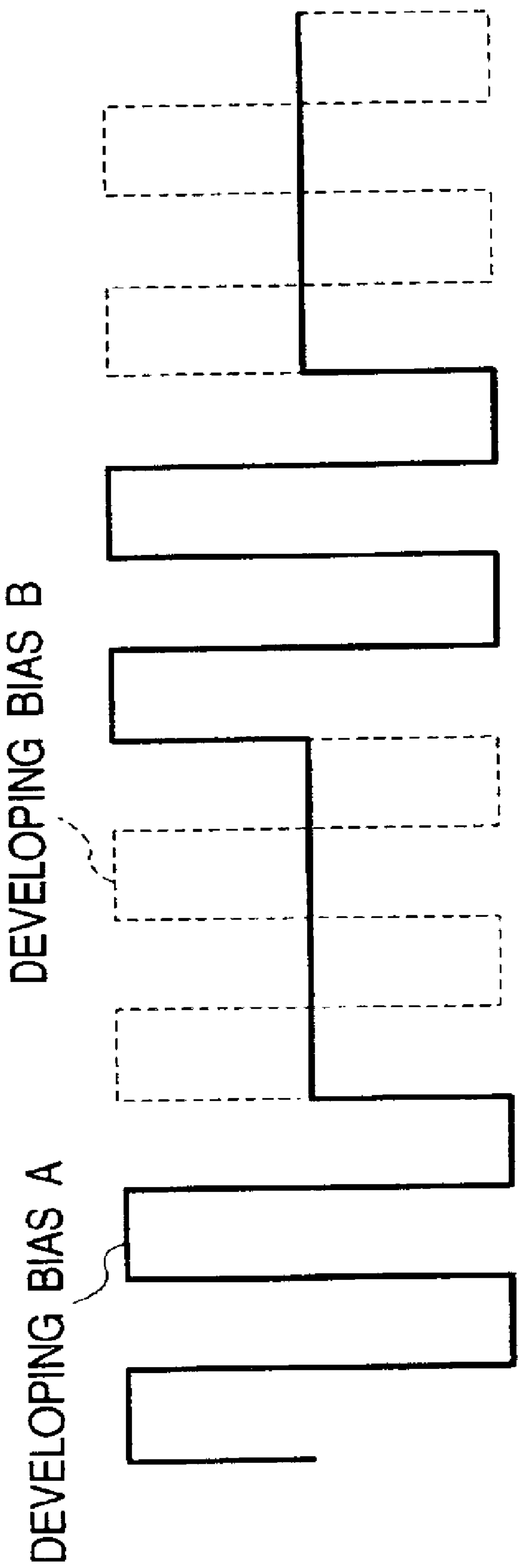
FIG. 9 is a view showing a method for forming waveforms of developing biases in another embodiment of the present invention.

Incidentally, in the first embodiment, while an example that, as shown in FIG. 1, two high voltage power supplies 100A, 100B for the developing biases are used was explained, in the second embodiment, as shown in FIG. 9, two developing biases are generated by a single high voltage power supply. That is to say, so long as AC bias waveform (developing bias A) having one cycle including two oscillating periods and two pausing periods alternately (two periods is an integral number in which phases are not deviated) can be generated, with respect to the rectangular waveform AC bias (developing bias B), the developing bias A and the developing bias B can be switched by the single high voltage power supply.

Explaining the gradation control of the image in the illustrated embodiment, as shown in FIG. 3, the electrostatic latent image corresponding to the output image is formed as the digital latent image on the image area C on the photosensitive drum 128, and, when the latent image reaches the developing station, the latent image is developed by the developing bias A. Then, as shown in FIG. 2, the gradation control patch latent images of potential Vp are formed as the digital latent images by the laser exposure $P_{hex}$ in the non-image area E on the photosensitive drum 128 until the electrostatic latent image for the next output image is formed, and such latent images are developed and are detected by the sensor 108, thereby effecting the image gradation control.

In this way, by maintaining the developing bias used in the developing of the image gradation controlling patch images in the non-image area during the copy sequence to the developing bias A in which the changed amount of the toner image density is small with respect to the changed amount of the density of the developer in the developing device, i.e., in which the density of the output image is stabilized, the reliability of the detecting output of the sensor 108 for the image gradation controlling patch images in the non-image area can be enhanced, the gradation of the image formed later can be corrected advantageously. Further, the output image in the image area can be an image having stable density and no fog.

Further, in the special control sequence other than the sequence during the normal image formation, the toner replenishing control patch image is formed on the photosensitive drum, and the patch image is formed as the analogue image different from the patch image during the image formation, and the developing bias is switched to the developing bias B. As a result, the reliability of the detecting output of the sensor 108 for the toner replenishing control patch image can be enhanced, and the amount of toner replenished to the developing device can be optimized. Further, the load acting on the developer is reduced and the stable output image having no fog can be obtained.

In the above-mentioned embodiments, while an example of the image forming apparatus in which the color image is formed by using the single photosenstive drum was explained, the present invention is not limited to such an example, but, the present invention can be applied to an image forming apparatus in which a plurality of (for example, four) photosensitive drums are provided along a recording material bearing member such as a conveying belt for bearing and conveying a recording material and four color (Y, M, C, K) toner images on the four photosensitive drums are successively transferred onto the recording material borne on the conveying belt in a superimposed fashion, thereby obtaining a full-color image on the recording material. In this case, by effecting the same control, similar advantages can be achieved.

Figure 10:
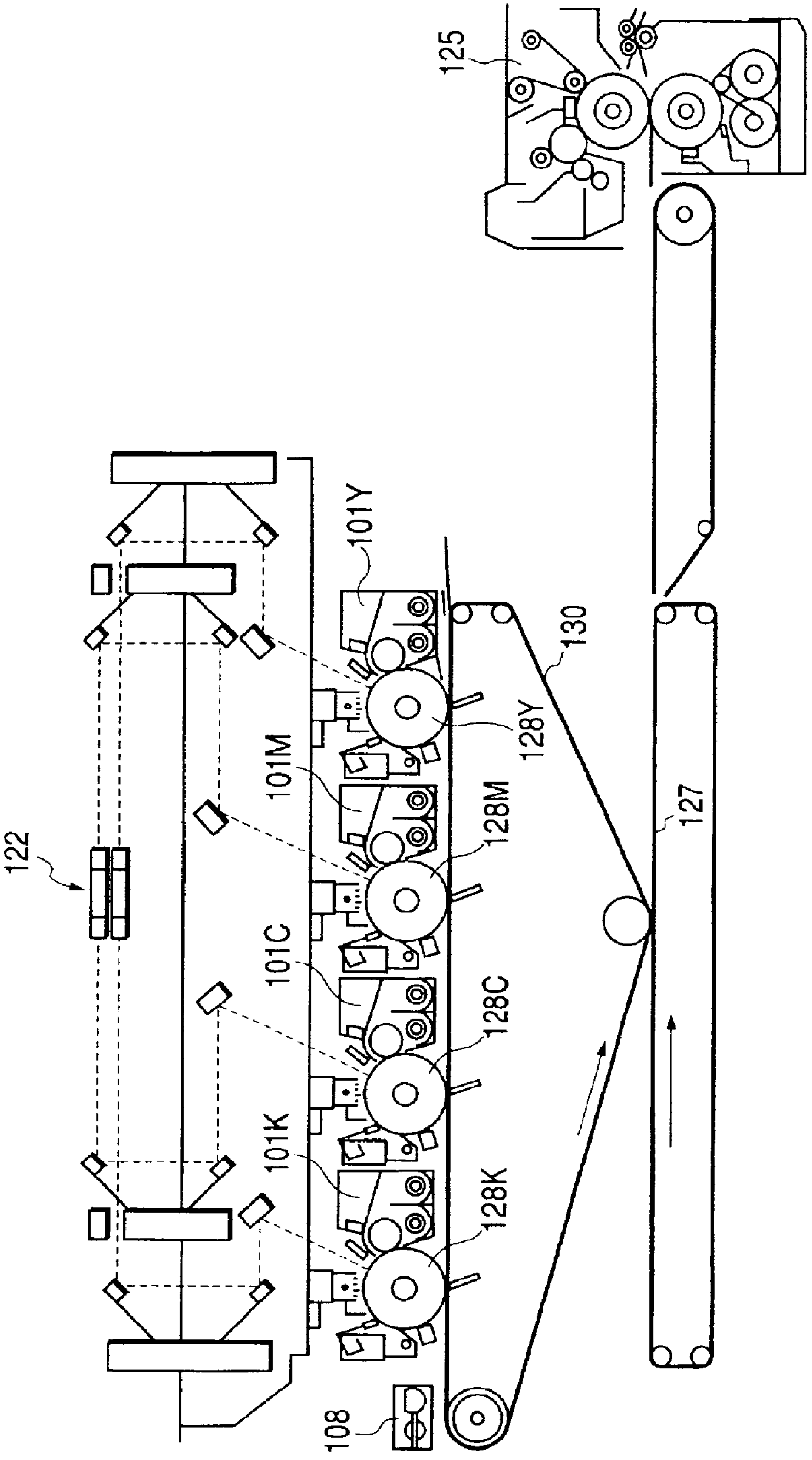
FIG. 10 is a schematic view showing another example of an image forming apparatus to which the present invention can be applied.
Figure 11:
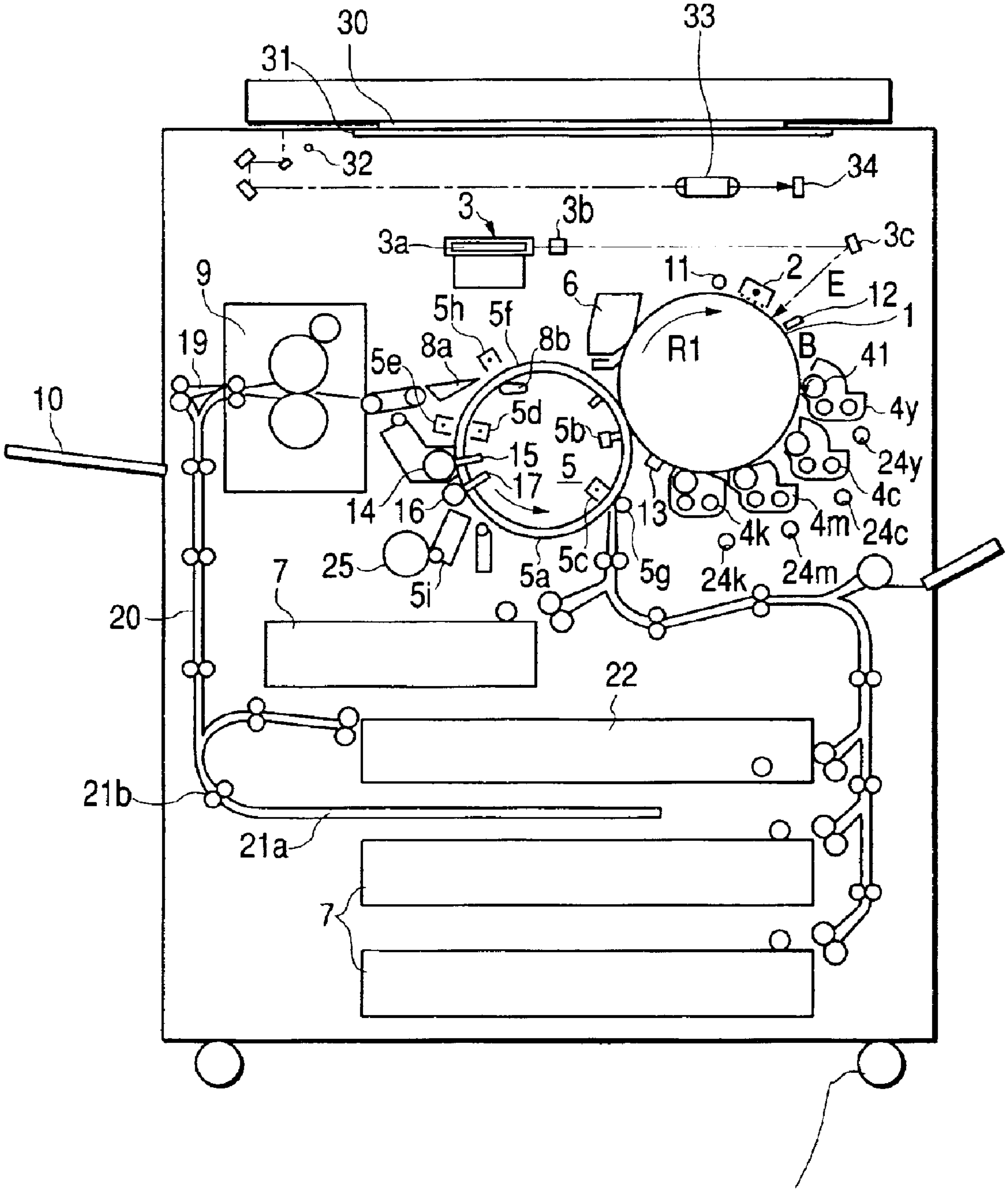
FIG. 11 is a detailed view showing a conventional image forming apparatus.

Further, as shown in FIG. 10, the present invention can be applied to an image forming apparatus of intermediate transferring type in which a plurality of (for example, four) photosensitive drums are provided along an intermediate transfer belt 130 as an intermediate transfer member, and four color (Y, M, C, K) toner images on the four photosensitive drums are successively first-transferred onto the intermediate transfer belt 130 in a superimposed fashion, and then, the four color toner images are collectively secondary-transferred onto a recording material conveyed by a conveying belt 127, thereby obtaining a full-color image on the recording material. In FIG. 10, the same elements as those in FIG. 1 are designated by the same reference numerals and detailed explanation thereof will be omitted.

In this case, although the densities of the toner replenishing patch images or the image gradation controlling patch images can be detected on the photosensitive drums 128 (128Y to 128K), the image density detecting sensor 108 may be arranged at a downstream side of the fourth color image forming portion and the color toner replenishing patch images or the image gradation controlling patch images may be successively transferred from the photosensitive drums 128Y to 128K onto the intermediate transfer belt 130 in a non-overlapped fashion, so that densities of the color toner replenishing patch images or the image gradation controlling patch images on the intermediate transfer belt 130 are detected by the single sensor 108. According to this arrangement, since plural detecting sensor 108 associated with the respective photosensitive drums 128Y to 128K may not be provided, cost can be reduced greatly.

Of course, also in the image forming apparatus in which the image is formed on the recording material on the recording material bearing member, color toner replenishing patch images or image gradation controlling patch images may be directly transferred onto the recording material bearing member from the photosensitive drums 128Y to 128K in a non-overlapped fashion, so that densities of the color toner replenishing patch images or the image gradation controlling patch images on the recording material bearing member can be detected by the single sensor 108.

Further, it should be noted that various alternations within the scope of the present invention can achieve the same advantages as the above-mentioned first and second embodiments.

What is claimed is:

1. A developing method for developing a latent image formed on an image bearing member with a developer including a toner and a carrier contained in a developer containing portion, the developing method comprising the steps of:

developing a latent image for controlling a replenishing amount of the developer to the developer containing portion using a first developing electrical field; and developing the latent image for a normal image using a second developing electrical field, wherein a changed amount of a density of the developed image with respect to a changed amount of a density of the toner in the developer in the developer containing portion is greater when using the first developing electrical field than when using the second developing electrical field.

2. A developing method according to claim 1, wherein the first developing electrical field is an alternating electrical field.

3. A developing method according to claim 1 or 2, wherein the second developing electrical field alternately includes a period during which an alternating electrical field is formed and a period during which the alternating field is not formed.

4. A developing method according to claim 1, further comprising the step of:

detecting information corresponding to a density of a developed image obtained by developing using first developing electrical field, wherein the replenished amount of the developer to the developer containing portion is controlled on the basis of the detected information.

5. A developing method according to claim 1, wherein the first developing electrical field is an alternating electrical field.

6. A developing method according to claim 1, further comprising the step of:

detecting information corresponding to a density of a developed image obtained by developing the first latent image, wherein a replenished amount of the developer to the developer containing portion is controlled on the basis of the detected information.

7. A developing method according to claim 1, further comprising the steps of:

detecting information corresponding to a density of the developed image obtained by developing the second latent image; and controlling a gradation of the developed image on the basis of the detected information.

8. A developing method for developing a latent image formed on an image bearing member with a developer including a toner and a carrier contained in a developer containing portion, the developing method comprising the steps of:

developing a first latent image for controlling a replenishing amount of the developer to the developer containing portion using a first developing electrical field; and developing a second latent image for controlling a gradation of a developed image using a second developing electrical field, wherein a changed amount of a density of the developed image with respect to a changed amount of a density of the toner in the developer in the developer containing portion is greater when using the first developing electrical field than when using the second developing electrical field.

9. A developing method according to claim 8, wherein the first developing electrical field is an alternating electrical field.

10. A developing method according to claim 8 or 9, wherein the second developing electrical field alternately includes a period during which an alternating electrical field is formed and a period during which the formation of the alternating electrical field is not formed.

11. A developing method according to claim 8, further comprising the step of:

detecting information corresponding to a density of a developed image obtained by developing the first latent image, wherein the replenished amount of the developer to the developer containing portion is controlled on the basis of the detected information.

12. A developing method according to claim 8, further comprising the steps of:

detecting information corresponding to a density of the developed image obtained by developing the second latent image; and controlling a gradation of the developed image on the basis of the detected information.

13. A developing apparatus comprising:

a developer containing portion for containing a developer including a toner and a carrier; and a developer carrying member for carrying the developer, wherein when a latent image is formed on an image bearing member, a developing electrical field is formed between said image bearing member and said developer carrying member, wherein the developing apparatus is operable in a plurality of modes including;

a first mode in which a latent image for controlling a replenishing amount of the developer to the developer containing portion is developed using a first developing electrical field; and a second mode in which a latent image for a normal image is developed using a second developing electrical field, wherein a changed amount of a density of a developed image with respect to a changed amount of a density of the toner in the developer in the developer containing portion is greater when using the first developing electrical field than when using the second developing electrical field.

14. A developing apparatus according to claim 13, wherein the first developing electrical field is an alternating electrical field.

15. A developing apparatus according to claim 13 or 14, wherein the second developing electrical field alternately includes a period during which an alternating electrical field is formed and a period during which the alternating electrical field is not formed.

16. A developing apparatus according to claim 13, further comprising:

a detector for detecting information corresponding to a density of developed image obtained by developing with the first developing electrical field, wherein the replenished amount of the developer to said developer containing portion is controlled on the basis of the detected information.

17. A developing apparatus according to claim 13, wherein the first developing electrical field is an alternating electrical field.

18. A developing apparatus according to claim 13, further comprising:

a detector for detecting information corresponding to a density of a developed image obtained by developing the first latent image, wherein a replenished amount of the developer to said developer containing portion is controlled on the basis of the detected information.

19. A developing apparatus according to claim 13, further comprising:

a detector for detecting information corresponding to a density of a developed image obtained by developing the second latent image; and a controller for controlling a gradation of the developed image on the basis of the detected information.

20. A developing apparatus comprising:

a developer containing portion for containing a developer including a toner and a carrier; and a developer carrying member for carrying the developer, wherein when a latent image is formed on an image bearing member, a developing electrical field is formed between said image bearing member and said developer carrying member, wherein the developing apparatus is operable in a plurality of modes including:

a first mode in which a first latent image for controlling a replenishing amount of the developer to the developer containing portion is developed using a first developing electrical field; and a second mode in which a second latent image for controlling gradation of a developed image is developed using a second developing electrical field, wherein a changed amount of a density of a developed image with respect to a changed amount of a density of the toner in the developer in the developer containing portion is greater when using the first developing electrical field than when using the second developing electrical field.

21. A developing apparatus according to claim 20, wherein the first developing electrical field is an alternating electrical field.

22. A developing apparatus according to claim 20 or 21, wherein the second developing electrical field alternately includes a period during which an alternating electrical field is formed and a period during which the alternating electrical field is not formed.

23. A developing apparatus according to claim 20, further comprising:

a detector for detecting information corresponding to a density of a developed image obtained by developing the first latent image, wherein the replenished amount of the developer to said developer containing portion is controlled on the basis of the detected information.

24. A developing apparatus according to claim 20, further comprising a detector for detecting information corresponding to a density of a developed image obtained by developing the second latent image; and a controller for controlling a gradation of the developed image on the basis of the detected information.

* * * * *